United States Patent
Masuda et al.

(10) Patent No.: US 9,089,213 B2
(45) Date of Patent: *Jul. 28, 2015

(54) STABILIZER, IMAGE FORMING APPARATUS, AND STABILIZER MOUNTING METHOD

(71) Applicants: Kabushiki Kaisha Toshiba, Tokyo (JP); Toshiba Tec Kabushiki Kaisha, Tokyo (JP)

(72) Inventors: Sadahiro Masuda, Shizuoka-ken (JP); Takashi Ogiwara, Shizuoka-ken (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/186,676

(22) Filed: Feb. 21, 2014

(65) Prior Publication Data

US 2014/0252931 A1    Sep. 11, 2014

Related U.S. Application Data

(63) Continuation of application No. 12/790,543, filed on May 28, 2010, now Pat. No. 8,693,916.

(60) Provisional application No. 61/184,680, filed on Jun. 5, 2009.

(51) Int. Cl.
*G03G 21/16* (2006.01)
*A47B 81/00* (2006.01)
(Continued)

(52) U.S. Cl.
CPC .............. *A47B 81/00* (2013.01); *A47B 91/005* (2013.01); *B60B 33/0002* (2013.01); *F16M 3/00* (2013.01); *G03G 21/16* (2013.01); *G03G 21/1604* (2013.01); *G03G 15/00* (2013.01); *G03G 2221/169* (2013.01); *G03G 2221/1654* (2013.01); *G03G 2221/1678* (2013.01); *Y10T 29/49826* (2015.01)

(58) Field of Classification Search
CPC ................................. G03G 15/00; G03G 21/16
USPC ........................................................... 399/107
See application file for complete search history.

(56) References Cited

U.S. PATENT DOCUMENTS 3,354,774 A * 11/1967 Smitzer et al. ................... 355/27
7,020,413 B2 * 3/2006 Hatakeyama ................. 399/107
(Continued)

FOREIGN PATENT DOCUMENTS

| CN | 1799009 | | 7/2006 | |
|---|---|---|---|---|
| JP | 2002-252475 | * | 9/2002 | ............. A47B 91/06 |

(Continued)

OTHER PUBLICATIONS

Chinese Office Action dated Mar. 7, 2012, filed in Chinese counterpart Application No. 201010200868.8, 23 pages (with English translation).

*Primary Examiner* — Clayton E LaBalle
*Assistant Examiner* — Kevin Butler
(74) *Attorney, Agent, or Firm* — Patterson & Sheridan, LLP (57) ABSTRACT

According to one embodiment, a stabilizer includes a jaw portion which contacts a bottom of an apparatus, a fastener to fasten the stabilizer to a lateral side of the apparatus, and a foot portion extending from the bottom of the apparatus toward far side and in obliquely downward.

4 Claims, 6 Drawing Sheets

(51) Int. Cl.
  *A47B 91/00* (2006.01)
  *B60B 33/00* (2006.01)
  *F16M 3/00* (2006.01)
  *G03G 15/00* (2006.01)

(56) References Cited

U.S. PATENT DOCUMENTS

| | | | |
|---|---|---|---|
| 7,431,287 B2 * | 10/2008 | Hayashi et al. | 271/162 |
| 2002/0098008 A1 * | 7/2002 | Tashiro et al. | 399/107 |
| 2004/0131384 A1 * | 7/2004 | Miyaji et al. | 399/124 |
| 2006/0214974 A1 * | 9/2006 | Isobe et al. | 347/18 |
| 2007/0048051 A1 * | 3/2007 | Nakajima et al. | 399/382 |
| 2008/0267659 A1 * | 10/2008 | Koyama | 399/107 |
| 2009/0310186 A1 * | 12/2009 | Nakai et al. | 358/401 |
| 2010/0308533 A1 * | 12/2010 | Masuda et al. | 271/264 |
| 2012/0098395 A1 * | 4/2012 | Sato | 312/236 |

FOREIGN PATENT DOCUMENTS

| | | | | |
|---|---|---|---|---|
| JP | 2002-296863 | | 10/2002 | |
| JP | 2003-129595 | * | 5/2003 | E04B 2/74 |
| JP | 2006-214450 | | 8/2006 | |
| JP | 2007-125229 | * | 5/2007 | A47B 13/06 |
| JP | 2007-310292 | | 11/2007 | |

* cited by examiner

STABILIZER, IMAGE FORMING APPARATUS, AND STABILIZER MOUNTING METHOD

CROSS-REFERENCE TO RELATED APPLICATION

This embodiment is based upon and claims the benefit of priority to U.S. patent application Ser. No. 12/790,543, filed on May 28, 2010, which claims the benefit of priority from U.S. provisional application 61/184,680, filed on Jun. 5, 2009, the entire contents of which are incorporated herein by reference.

FIELD

Embodiments described herein relate generally to stabilizers for an image forming apparatus.

BACKGROUND

Stabilizers are mounted to the image forming apparatus, and prevent overturning of the image forming apparatus. The stabilizers are removable from an image forming apparatus. After the image forming apparatus was set on a prescribed position, the stabilizers are mounted to the image forming apparatus.

DETAILED DESCRIPTION

In general, stabilizers require a high intensity. When ribs formed to the stabilizer for increasing the intensity expose at the bottom of the stabilizer, the ribs are caught in piles of a carpet and disturb the mounting operation of the stabilizer to the image forming apparatus set on the carpet.

In one embodiment, a stabilizer includes a jaw portion which contacts a bottom of an apparatus, a fastener to fasten the stabilizer to a lateral side of the apparatus, and a foot portion extending from the bottom of the apparatus toward far side and in obliquely downward. Hereafter, a term "far side" refers to the rightward or leftward direction and portion of the image forming apparatus 100. While a term "near side" refers to the inward direction or portion of the image forming apparatus 100.

Figure 1:
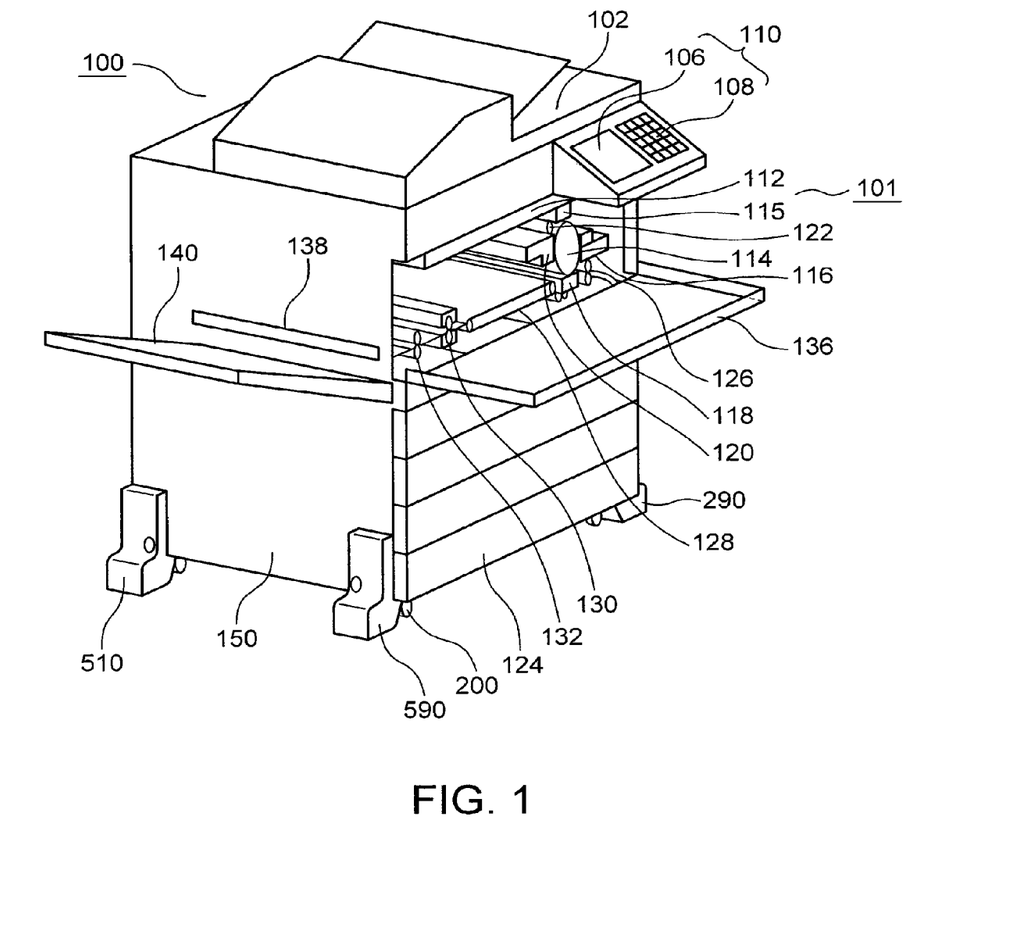
FIG. 1 is a perspective view showing the image forming apparatus mounted with the stabilizer seen ahead of the apparatus on the left and somewhat obliquely upper side.

FIG. 1 is a perspective view showing the image forming apparatus 100 mounted with the stabilizers according to this embodiment seen ahead of the apparatus on the left and somewhat obliquely upper side. The image forming apparatus 100 is provided with an image reading unit 102 and an image forming unit 101. On the top of the image forming apparatus 100, rested a control panel 110 which is provided with a touch panel type display 106 and various kinds of operation keys 108. The side provided with the control panel 110 is a front side of the image forming apparatus 100. While the other side opposite the side provided with the control panel 110 is a rear side of the image forming apparatus 100. Hereafter, similarly, a term "front side" refers about each member refers to a frontward direction or portion of the image forming apparatus 100, and a term "rear side" refers to the rearward direction or portion of the image forming apparatus 100.

The operation keys 108 of the control panel 110 includes numeric keys, a reset key, a stop key, a start key, etc. By using the control panel 110, information inputting needed for setting sheet size, number of copies, printing density, use or disuse of stapling etc., are carried out.

The image forming unit 101 includes a laser unit 112, a photo-sensitive drum 114, a charger 115, a developing device 116, an image transfer device 118, a drum cleaner 120, and a charge elimination unit 122. Further, the image forming apparatus 100 includes a sheet feeder 124, a conveying path 126, a conveyer belt 128, a fuser 130, an exit roller 132, and a maintenance door 136.

The charger 115 charges the surface of the photo-sensitive drum 114 during rotation. The laser unit 112 forms an electrostatic latent image on the surface of the charged photo-sensitive drum 114. The developing device 116 forms a toner image by making toner particles adhere to the electrostatic latent image on the photo-sensitive drum 114. To the sheet conveyed from the sheet feeder 124 through the conveying path 126, image transfer device 118 transfers a toner image. The drum cleaner 120 removes the toner particles remaining on the photo-sensitive drum 114 without being transcribed. The charge elimination unit 122 eliminates the electrified charge on the peripheral surface of the photo-sensitive drum 114.

The conveyer belt 128 conveys the sheet carrying the transferred toner image to the fuser 130. The fuser 130 fixes the toner image on the sheet. A sheet ejection opening 138 is provided on the left lateral side 150 of the image forming apparatus 100. The exit roller 132 ejects the sheet carrying thereon the fixed toner image to a receiving tray 140 through the sheet ejection opening 138. The image forming apparatus 100 includes the maintenance door 136 for opening the fuser 130 in front of the apparatus 100. Four casters 200 are provided on four corners of the bottom of the image forming apparatus 100 in one-to-one relationship to the respective caster 200. The casters 200 are able to rotate for allowing movement of the image forming apparatus 100 back and forth and around. The casters 200 may be swivel casters rotatable in the horizontal plane, in order to change the moving direction of the image forming apparatus 100.

In the vicinity of two left side casters 200, two stabilizers are respectively provided in one-to-one relationship to the respective caster 200. That is, a left rear stabilizer 510 and a left front stabilizer 590 are provided on two left corners of the image forming apparatus 100. Hear, the front side stabilizers, i.e., the left front stabilizer 590 and a right front stabilizer 290 are respectively provided on the left and right lateral sides of the image forming apparatus 100 in bearing away the front of the image forming apparatus 100 for not disturbing drawing operations of the sheet feeder 124.

Figure 2:
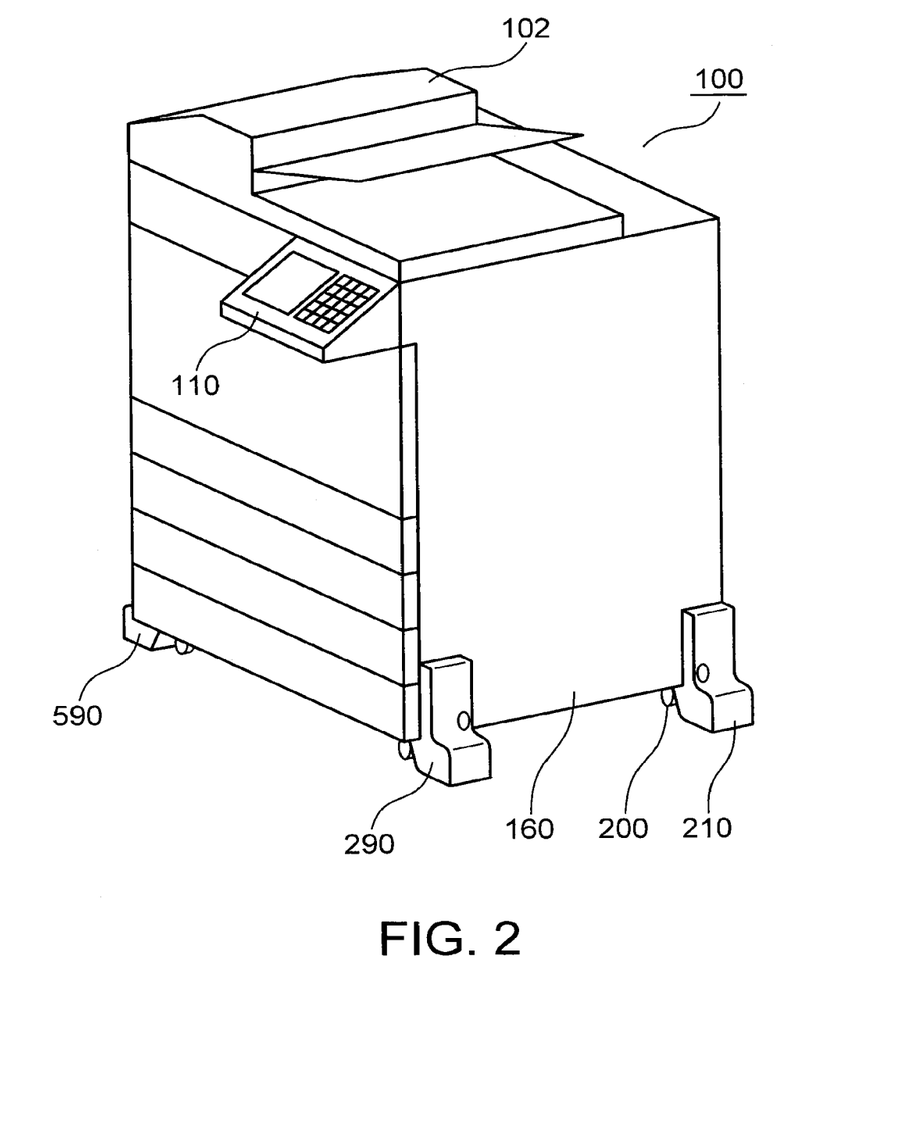
FIG. 2 is a perspective view showing the image forming apparatus mounted with the stabilizers seen from ahead of the apparatus on the right and somewhat obliquely upper side.

FIG. 2 is a perspective view showing the image forming apparatus 100 mounted with the stabilizers seen from ahead of the apparatus on the right and somewhat obliquely upper side. In the vicinity of two right side casters 200, two stabilizers are respectively provided in one-to-one relationship to the respective right side casters 200. That is, a right rear stabilizer 210 and the right front stabilizer 290 are provided on two right corners of the image forming apparatus 100.

Figure 3:
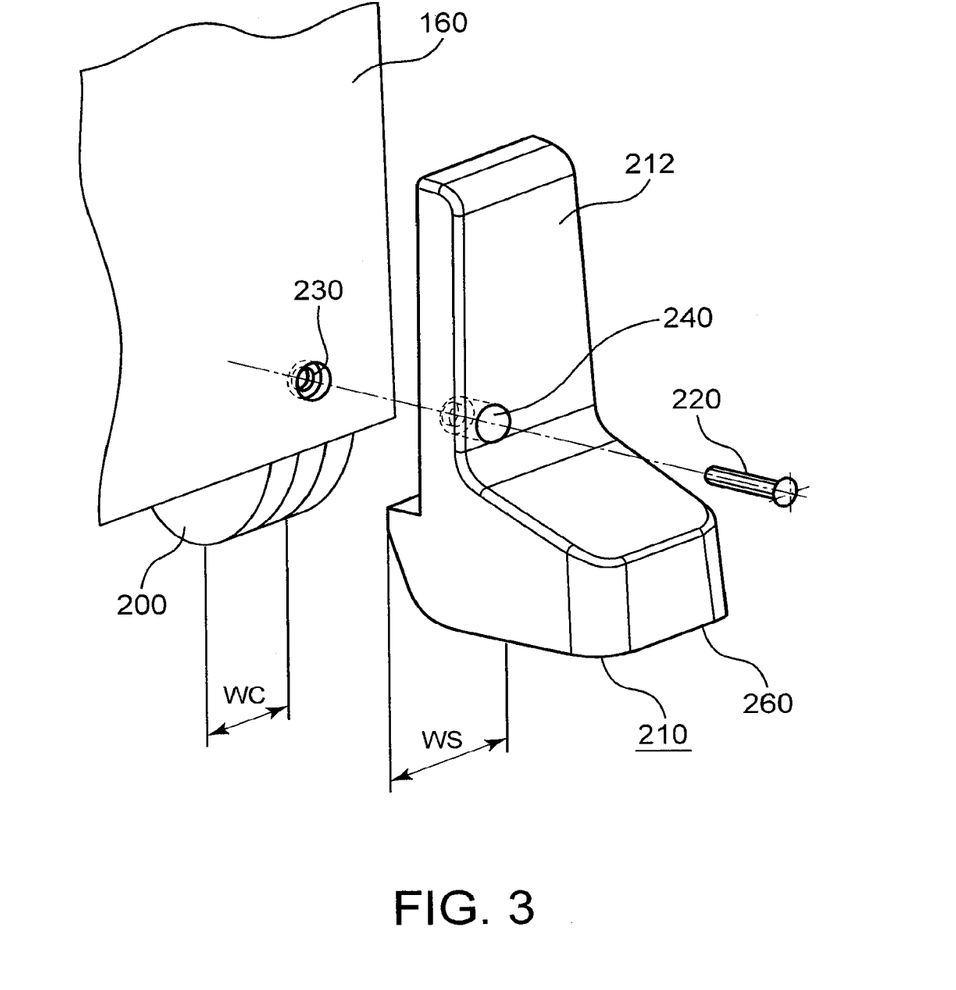
FIG. 3 is a perspective view showing illustratively an aspect of mounting the stabilizer to the right lateral bottom rearward portion of the image forming apparatus.

FIG. 3 is a perspective view showing illustratively one aspect of mounting the stabilizer to the right lateral bottom rearward portion of the image forming apparatus. The upper portion of the right rear stabilizer 210 is referred to a pillar portion 212, and the lower portion of the right rear stabilizer 210 is referred to a foot portion 214. The width of the foot portion 214 in the longitudinal direction of the image forming apparatus 100 is set to WS. The width WS is larger than the width WC of the rim of the caster 200. The foot portion 214 lies next to the caster 200 on the far side so as to protect the caster 200. The upper surface of the foot portion 214 inclines down toward the far side so as to prevent accumulation of dust thereon. The foot portion 214 extends to the far side so as that the foot portion 214 touches the floor in a site far away from the gravity center of the image forming apparatus 100 more than the caster 200, when the image forming apparatus 100 leant. A screw hole 230 is provided on the right lateral side 160 of the image forming apparatus 100. The pillar portion 212 is provided with a stepped hole 240. The right rear stabilizer 210 on the right rearward of the image forming apparatus 100 narrows toward the right far side. A screw 220 resides in the stepped hole 240. The stepped hole 240 serves as a fastener in cooperation with the screw 220 and the screw hole 230.

Figure 4:
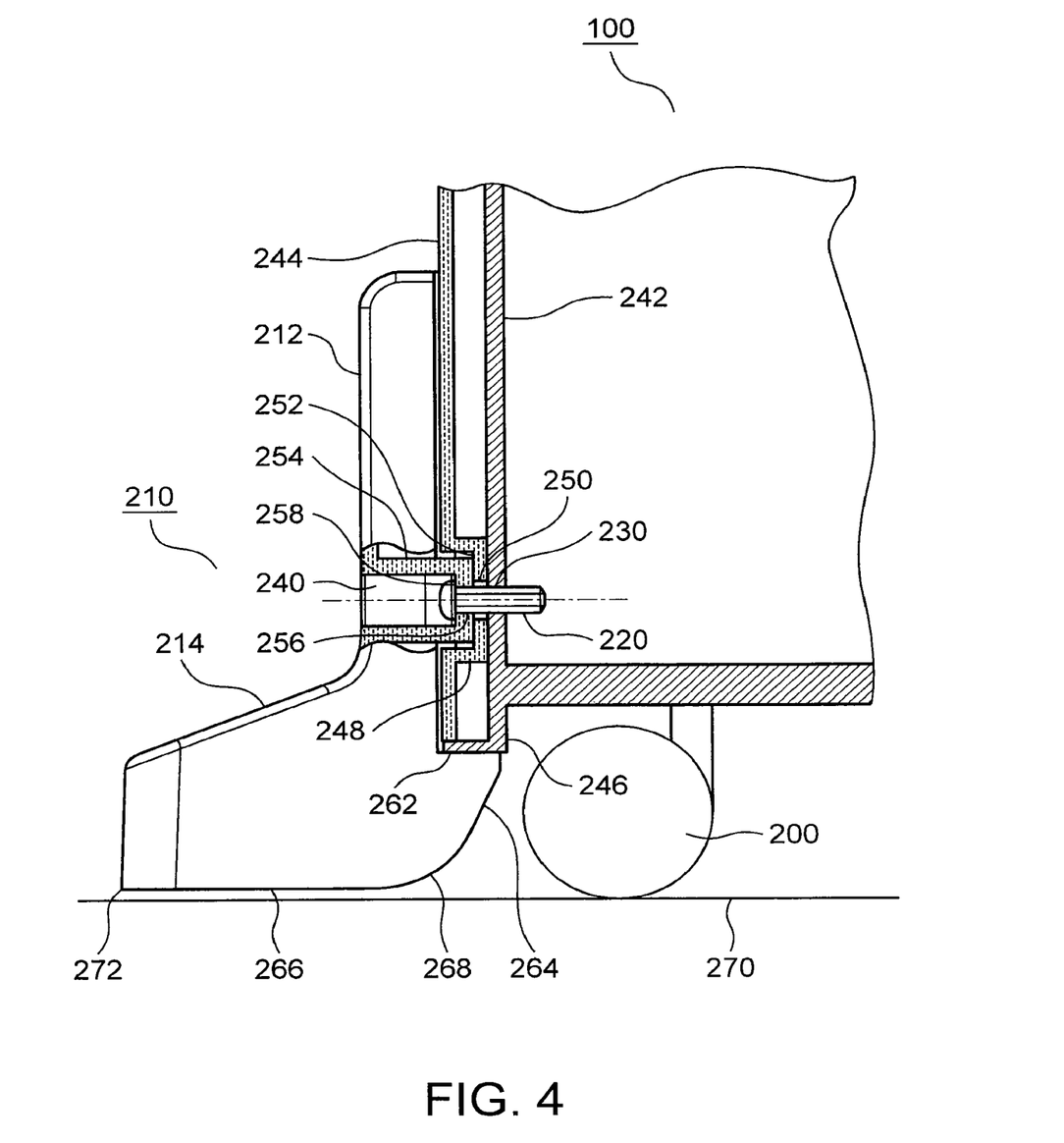
FIG. 4 is a sectional view showing the mounted state of the stabilizer to the image forming apparatus.

FIG. 4 is a sectional view showing the mounted state of the right rear stabilizer 210 according to the present invention to the image forming apparatus 100. The casters 200 support a chassis 242. The chassis 242 is made of metal. The chassis 242 is provided on its outer end a flange 246 with a bottom. A face panel 244 is provided with a boss 248 in the position facing the screw hole 230. The face panel 244 is made of plastic. The boss 248 has a hole 250 in accompanying with a step 252. The size of the hole 250 is larger than the diameter of the screw 220.

The right rear stabilizer 210 is made of plastic. Of the right rear stabilizer 210, a portion within the image forming apparatus 100 corresponds to the near side as mentioned above. Of the right rear stabilizer 210, a portion outside the image forming apparatus 100 corresponds to the far side as mentioned above. The near side of the pillar portion 212 contacts the face panel 244. The pillar portion 212 is provided with a boss 254 in the position facing the screw hole 230. The boss 254 has a hole 256 in accompanying with a step 258. The outer diameter of the boss 254 is smaller than the inner diameter of the boss 248, and larger than the diameter of the hole 250.

The boss 254 contacts the step 252 in the boss 248. The boss 248 contacts the chassis 242. The screw hole 230 holds the screw 220 for fastening the steps 252 and 258 to the chassis 242. The head of the screw 220 screwed to the chassis 242 fastens the step 258 to the chassis 242 via the step 252. Therefore, the screw 220 and the chassis 242 hold the right rear stabilizer 210 and the face panel 244 between them.

The right rear stabilizer 210 has a jaw portion 262. The jaw portion 262 has a horizontal top plane. The jaw portion 262 projects toward the near side much more the near side surface of the pillar portion 212. The jaw portion 262 contacts the horizontal bottom plane of the flange 246, in the state that the screw 220 fastens the right rear stabilizer 210 to the chassis 242. The diameter of the hole 256 has a margin to the diameter of the screw 220. The margin makes possible to adjust the location of the jaw portion 262 in the state of the screw 220 is loosened so as that the jaw portion 262 contacts the horizontal bottom plane of the flange 246.

A lower part of edging 264 extending downward from the jaw portion 262 lies, the edging 264 projects to the far side of the lateral side. A bottom edge 266 lies horizontally, in the state that the screw 220 is fastening the right rear stabilizer 210 to the chassis 242. The bottom edge 266 has a clearance between an underlayment 270 of a carpet 284, in the state that the screw 220 is fastening the right rear stabilizer 210 to the chassis 242. When the image forming apparatus 100 inclines, the inferior edge of a far side wall 272 of the bottom edge 266 hits against the underlayment 270.

Figure 5:
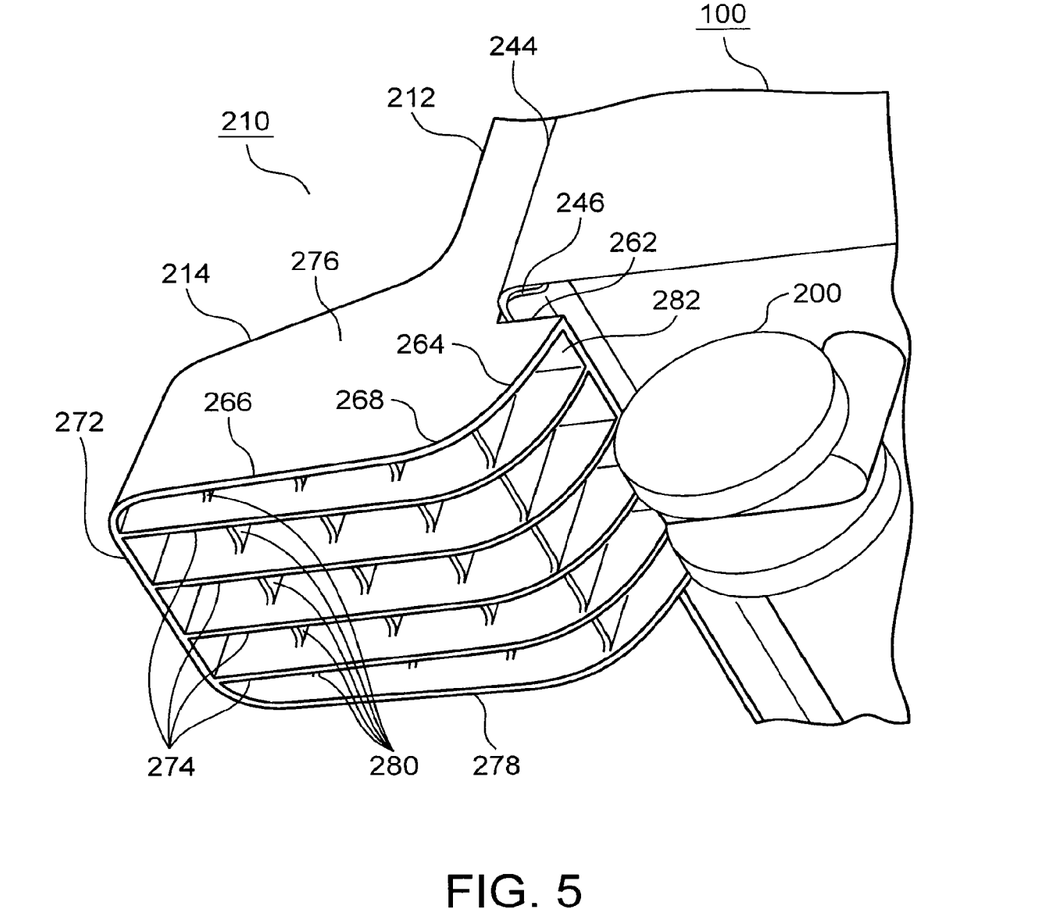
FIG. 5 is a perspective view seeing the stabilizer mounted to the image forming apparatus as shown in FIG. 4 from rearward and slightly downward.

FIG. 5 is a perspective view seeing the stabilizer mounted to the image forming apparatus as shown in FIG. 4 from rearward and slightly downward. The right rear stabilizer 210 has bottom ribs 274. A plurality of bottom ribs 274 are provided. The plurality of bottom ribs 274 are parallel to the pillar portion 212, and also parallel to each other, too. The plurality of bottom ribs 274 point in the lateral direction. The right rear stabilizer 210 has a front-side wall 278 which forms a front-side wall and a rear-side wall 276 which forms a rear-side wall. The bottom ribs 274 and the bottom edge 266 are not parallel to each other in the horizontal plane. The inferior ends of the plurality of bottom ribs 274, the front-side wall 278, and the rear-side wall 276 are the same in height from the underlayment 270.

The plurality of bottom ribs 274, the front-side wall 278 and the rear-side wall 276 firmly support the far side wall 272 which hits against the underlayment 270, when the image forming apparatus 100 inclined.

A plurality of column ribs 280 are formed between the plurality of bottom ribs 274 which adjoin with the front-side wall 278 and the rear-side wall 276, and bridge them with each other. These column ribs 280 are parallel with the front rear direction. The right rear stabilizer 210 has column ribs 280 of four rows ranging from the far side to the near side. The inferior end of column rib 280 has the height higher than the inferior ends of bottom ribs 274 from the underlayment 270. There is no structures whose heights from the underlayment 270 is lower than the inferior end of the bottom ribs 274 in the space enclosed with the front-side wall 278, the rear-side wall 276, the far side wall 272, and the plurality of bottom ribs 274.

A ceiling shell 282 couples the plurality of bottom ribs 274, the front-side walls 278 and the rear-side walls 276 with each other in the jaw portion 262. The ceiling shell 282 is flat. The ceiling shell 282 contacts the horizontal bottom plane of the flange 246 as the jaw portion 262. The ceiling shell 282 bears the load of the image forming apparatus 100 applied from the horizontal bottom plane of the flange 246. A stress applied to the fastener is reduced owing to the ceiling shell 282.

Figure 6:
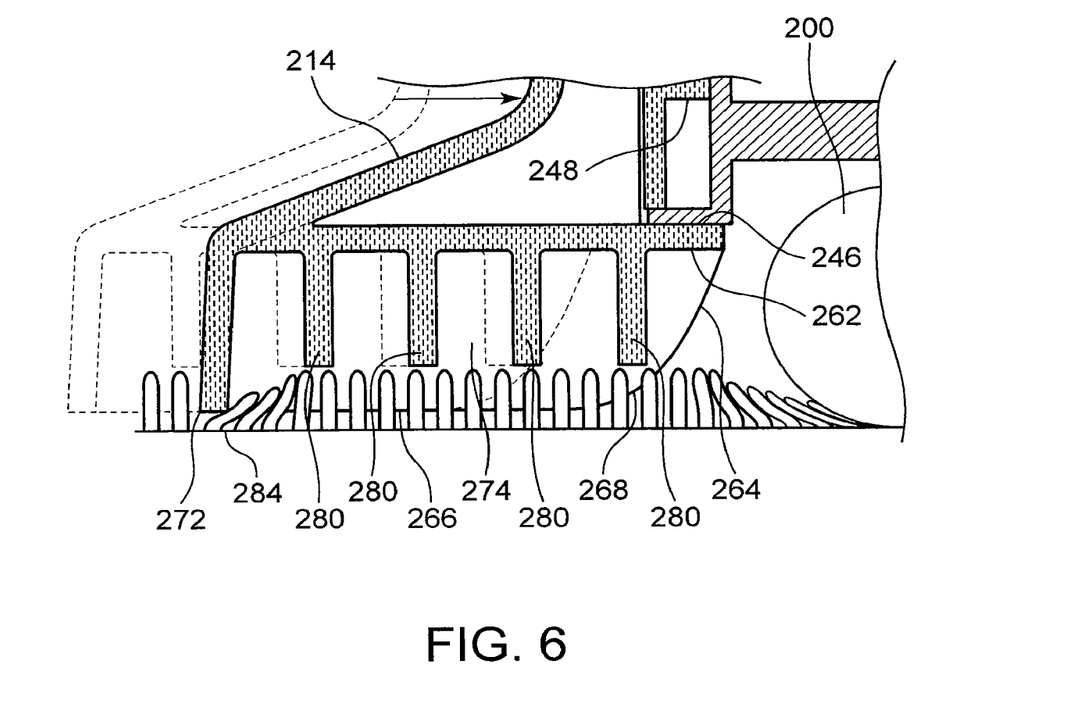
FIG. 6 is a sectional view showing the image forming apparatus mounted with the stabilizer in the state that the apparatus is set on a carpet.

FIG. 6 is a sectional view showing the image forming apparatus 100 mounted with the right rear stabilizer 210 in the state that the apparatus 100 is set on the carpet. The bottom ribs 274 pointing in the lateral direction almost fail to receive resistance of the carpet 284 when the right rear stabilizer 210 is mounted to the mage forming apparatus 100 in sliding on the carpet 284. Since the bottom ribs 274 has a narrow contact surface with the carpet 284, a forcing down to piles of the carpet 284 is little in compared to those that have a wholly flat bottom surface. The edging 264 inclines more and more so as that the edging 264 becomes easy to force down the pile of the carpet 284. The inferior ends of the column ribs 280 lie higher than the inferior ends of the bottom ribs 274, in order to avoid the resistance of the piles of the carpet 284.

The inferior ends of the column ribs 280 may lie higher than the piles of the carpet 284, in order to avoid the resistance of the piles of the carpet 284.

While certain embodiments are described, those embodiments are presented by way of example only, and are not intended to limit the scope of the inventions. Indeed, the novel methods and apparatuses described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A stabilizer comprising:
   a jaw portion which contacts a bottom side of an apparatus;
   a fastener which fastens the stabilizer to a lateral side of the apparatus;
   a foot portion extending from an end portion of the jaw portion; and
   a pillar portion through which the fastener extends, the pillar portion having a side which contacts the lateral side of the apparatus.

2. The stabilizer of claim 1, further comprising:
   a plurality of bottom ribs extending parallel to each other and in a direction parallel to a front of the apparatus; and
   a plurality of column ribs each extending between adjacent ribs of the plurality of bottom ribs.

3. An image forming apparatus, comprising:
   a sheet feeder to feeding sheets;
   an image forming unit to form image on the sheet;
   a chassis to hold the sheet feeder and the image forming unit;
   a caster to support the chassis; and
   a stabilizer including:
   a jaw portion which contacts a bottom side of an apparatus;
   a fastener which fastens the stabilizer to a lateral side of the apparatus;
   a foot portion extending from an end portion of the jaw portion toward far side; and
   a pillar portion through which the fastener extends, the pillar portion having a side which contacts the lateral side of the apparatus.

4. The image forming apparatus of claim 3, further comprising:
   a plurality of bottom ribs extending parallel to each other and in a direction parallel to a front of the apparatus; and
   a plurality of column ribs each extending between adjacent ribs of the plurality of bottom ribs.

* * * * *